Dec. 16, 1969               F. M. WOOD               3,484,682
APPARATUS AND METHOD TO DETECT DEFECTS MASKED BY CYCLIC
MAGNETIC PATTERNS IN FERROMAGNETIC PIPE
Filed Aug. 22, 1967               4 Sheets-Sheet 1

Fenton M. Wood
INVENTOR

BY Arnold, Roylance,
Kruger & Durkee
ATTORNEYS

United States Patent Office 3,484,682
Patented Dec. 16, 1969

3,484,682
APPARATUS AND METHOD TO DETECT DEFECTS
MASKED BY CYCLIC MAGNETIC PATTERNS IN
FERROMAGNETIC PIPE
Fenton M. Wood, Sugarland, Tex., assignor to American
Machine & Foundry Co., New York, N.Y., a corporation of New Jersey
Filed Aug. 22, 1967, Ser. No. 662,429
Int. Cl. G01r 33/12, 33/14
U.S. Cl. 324—37
29 Claims

ABSTRACT OF THE DISCLOSURE

Apparatus and method to be used in electromagnetic inspection of ferromagnetic pipe to detect defects when defect signals are hidden among magnetic detector responses attributable to noninjurious cyclic magnetic patterns of known form. Search-coil transducers are circumferentially disposed around the magnetized pipe to induce discrete signals of the same polarity and, when caused by the cyclic magnetic pattern of known form, to simultaneously induce discrete signals having the same time phase relationship. The detected signals are averaged, and the average signal is subtracted from each of the discrete detected signals to produce a difference signal that represents the true defect signal.

BACKGROUND OF THE INVENTION

This invention relates to electromagnetic inspection of ferromagnetic materials, and more particularly to improvements in inductive electromagnetic inspection of pipe for defects when the pipe has a natural cyclic magnetic pattern of known form due to noninjurious pipe variations. Nickel and cobalt as well as iron are included within the term "ferromagnetic."

When magnetized, the magnetic field pattern surrounding a given piece of pipe such as oil well drill pipe or pipeline, reflects the history of the given length of pipe, including the rolling of the solid metal into pipe form, variations in hardness, surface variations due to handling and abrasive wear, pitting due to corrosion, fatigue cracks and other structural and metallurgical conditions., As is well known in the art of electromagnetic inspection of pipe, an analysis of the general magnetic pattern of the pipe reveals its condition. However, in such an analysis of the general magnetic pattern of the pipe, difficulty arises in detecting flaw signals produced by localized flaws in the presence of some cyclic noise resulting from noninjurious pipe variations. Examples of such noninjurious variations are slightly abnormal hardness variations which do not materially affect the strength of the pipe to absorb working stress, nonuniformity of cross section of the pipe member, primarily at the upset or thick end portions of drill pipe, the cyclic variations produced in the natural magnetic pattern of the pipe because of the "rifling" effect created within the pipe wall structure when it is rolled during manufacture, and the variations produced because of the cold working of the steel pipe in attempting to smooth out the "rifling."

The latter problem, dealing with the cyclic variations created by "rifling," is most critical when attempting to detect minute fatigue cracks and to grade pitting in used pipe or pipeline when the pits are quite numerous. Such cyclic noise resulting from noninjurious pipe variations masks the defect indications that are the subject of the electromagnetic inspection.

In United States Patent 2,746,012 issued to Price on May 15, 1956, several search-coil wiring schemes for reducing this rifling noise are disclosed. These wiring schemes are quite useful when detecting fatigue cracks in the presence of pipe rifling.

However, when pitting is being graded in used pipe or pipeline and the pits are quite numerous, then there is good probability that two pits will encounter oppositely polarized magnetic transducers and thus their voltages will cancel and produce no pitting signal on the recorded log. A slightly different spatial arrangement of the pits may cause the two pit signals to add together and produce a signal on the recorded log which is clearly misrepresentative of the size of the pits encountered.

Another technique for reducing the rifling noise is to use a search-coil whose length is as short as possible. The limiting dimension is the width of the fatigue crack or pit on which a full signal is desired. However, in pit grading of pipe it is essential that the number and size of all pits be recorded for analysis.

SUMMARY OF THE INVENTION

The present invention overcomes the deficiencies of presently used techniques by providing a novel means to determine the natural cyclic magnetic pattern of pipe due to rifling or to regular cyclic changes of uniformity in cross section, to subtract this cyclic noise component from the total detected signal, and to record for analysis the difference signal that represents the defect under consideration.

Accordingly, one feature of this invention is to provide improved means for locating and evaluating fatigue induced defects and corrosive pitting in pipe.

Another feature of this invention is to provide a means of eliminating indications of cyclic magnetic pattern of known form while extracting and recording fatigue and corrosion pitting defects.

A further feature of this invention is to provide improved means for distinguishing corrosion pitting from the cyclic magnetic pattern of known form produced by rifling or regular cyclic changes of uniformity in cross section.

Still another feature of this invention is to provide a method of determining the average level of the noise signal produced by rifling or regular cyclic changes of uniformity in cross section in the pipe, eliminating the noise component from the total detected signal prior to recording, and recording the remaining defect signals for analysis.

Generally, in the present invention, some or all of these features are attained by use of an arrangement of detecting coils extending circumferentially around the pipe in a manner to trace the helical pattern of the pipe rifling, appropriate amplifiers to raise the detected signals to preselected values, an averaging circuit to determine the average signal level of the rifling induced noise, a subtracting circuit to subtract the average rifling signal from each of the detected signals, and recorders to record the difference signal reflecting the emphasized defect signals.

The detecting or search coils are arranged circumferentially around the pipe in a helical line having the same helix angle as the rifling of the pipe. Each of the coils is wound in the same sense as the others to induce signals of the same polarity. The circumferential arrangement of the search-coils in a helical pattern around the pipe insures that each signal induced in the coils by the rifling will be in the same time phase relationship.

The pipe is magnetized in any accepted manner that provides a high degree of active or residual magnetism for inspection. A method utilizing a longitudinal magnetic flux field is preferable. The search-coils are adapted for movement relative to the magnetized pipe for detection of the variations in the magnetic flux surrounding the pipe.

Each detector or search-coil is associated with a separate amplifier and recording circuit for the ultimate recording of the detected magnetic variations in the pipe. An averaging circuit receives the detected amplified signals and produces an average signal that represents substantially the noise signal caused by rifling. This average signal is subtracted from each of the detected amplified signals to cancel out the component corresponding to the rifling noise.

The difference signal, representing substantially the signal caused by the defect under consideration, is amplified and recorded for analysis. The average signal could also be recorded for anlysis purposes.

BRIEF DESCRIPTION OF THE DRAWINGS

In order that the manner in which the above recited advantages and features of the invention are attained, as well as others which will become apparent, can be understood in detail, more particular description of the invention may be had by reference to the embodiments thereof which are illustrated in the appended drawings, which drawings form a part of this specification. It is to be noted, however, that the appended drawings illustrated only typical embodiments of the invention and therefore are not to be considered limiting of its scope, for the invention may admit to other equally effective embodiments.

In the drawings.

DESCRIPTION OF THE PREFERRED EMBODIMENTS

Figure 1:
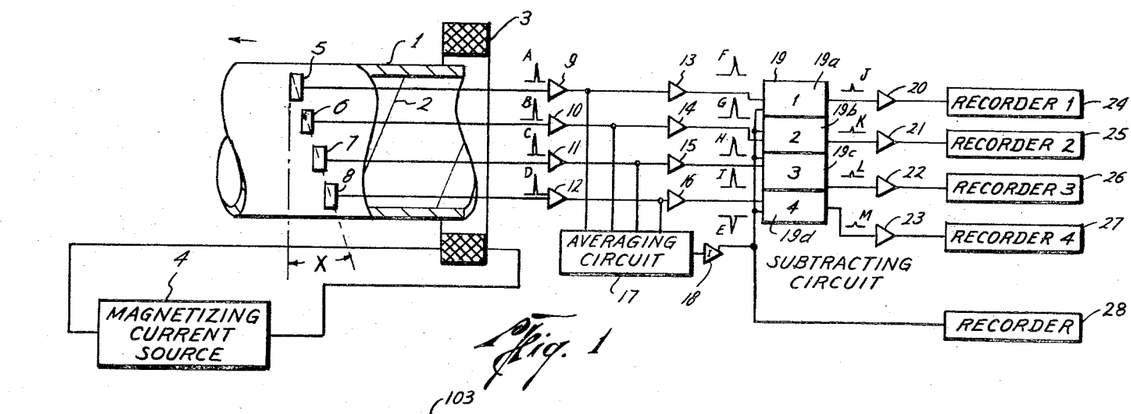
FIGURE 1 is a simplified schematic of the preferred embodiment of the present invention.

Referring now to the drawings and first to FIGURE 1, a simplified schematic of the preferred embodiment is shown. Pipe 1 with interior rifling 2 is shown with magnetizing coil 3 surrounding its exterior wall surface. Coil 3 is coupled to current source 4 to provide a longitudinal magnetic flux field with which to saturate pipe 1. Of course, any other suitable technique of longitudinally magnetizing the pipe could be used. A circumferential flux field may be used for inspection, although the use of the longitudinal field is preferred.

Transducers 5–8 are identical search-coils, magnetometers or other magnetic anomaly detectors mounted for longitudinal movement along the surface of pipe 1. The transducers are arranged circumferentially around the exterior or interior surface of pipe 1 along a helical line having a helix angle, measured from a line perpendicular to the longitudinal axis of the pipe, corresponding to the helix angle of pipe rifling 2. Each of the detectors of transducers 5–8 is connected in the same sense as the other detectors in order that the induced signals will all be of the same polarity. It is necessary that transducers 5–8 be distributed in the helical pattern circumscribing the surface of pipe 1 in order that the signals produced in each coil, as a result of the natural pipe rifling 2, will all be in the same time phase relationship.

The helix angle X is predetermined by actual measurement of the rifling helix angle within a section of pipe to be inspected. One method of such measurement is to conventionally detect the magnetic pattern of the pipe by using detectors encircling the pipe in a plane perpendicular to the longitudinal axis of the pipe. Such conventional detection will indicate the cyclic magnetic pattern as a series of discrete signals induced in the various detectors with a fixed time interval between each induced signal. The fixed time interval between the series of signals induced by the cyclic magnetic variation in the pipe can be plotted with relation to the circumferential spacing of the coils to produce a helical trace of the cyclic magnetic pattern from which the helix angle can be determined. Of course, manufacturer's records of the angles of pipe rifling created during pipe manufacture can be useful as an initial source for the helix angle to be used, or as a cross-check on the measured angle.

As transducers 5–8 are moved relative to the surface of pipe 1, each transducer detects the variations in the magnetic flux due to injurious and noninjurious pipe wall variations emanating from the pipe surface. This varying magnetic flux induces a varying current in each search-coil proportional to the magnetic flux variation. Since each of transducers 5–8 will simultaneously encounter the magnetic flux variation due to pipe rifling 2, the signals induced in transducers 5–8 will all be in the same time phase relationship and approximately the same magnitude better shown as A through D of FIGURE 1.

Transducers 5–8 are coupled to identical amplifiers 9–12 which amplify the detected signals, shown as A through D of FIGURE 1, to a preselected signal level. The outputs of amplifiers 9–12 are coupled to the inputs of identical amplifiers 13–16, respectively, and to an averaging circuit 17. Averaging circuit 17 produces an average of the input signals that represents primarily the signal caused by pipe rifling 2.

The output of averaging circuit 17 is then applied to the input of inverter 18 which produces an inverted average signal shown at E of FIGURE 1. This inverted average signal is still in the same time phase relation to the amplified detected signals, shown as F through I of FIGURE 1, although of opposite polarity.

The amplified output signals of amplifiers 13–16 are coupled to subtracting circuit 19. The inverted average signal from inverter 18, shown as E in FIGURE 1, is applied to each subtracting circuit 19a–19d to subtract the average signal E from each amplified detected signal, shown as F through I of FIGURE 1, resulting in difference signals, illustrated as J through M of FIGURE 1, representing substantially true pitting signals with rifling signals virtually eliminated.

The resultant plurality of difference signals, J through M of FIGURE 1, are applied to amplifiers 20–23 and then to recorders 24–27 to record the pitting signals for analysis. A recorder 28 may be provided to record the inverted average signal E for further analysis if desired.

Figure 2:
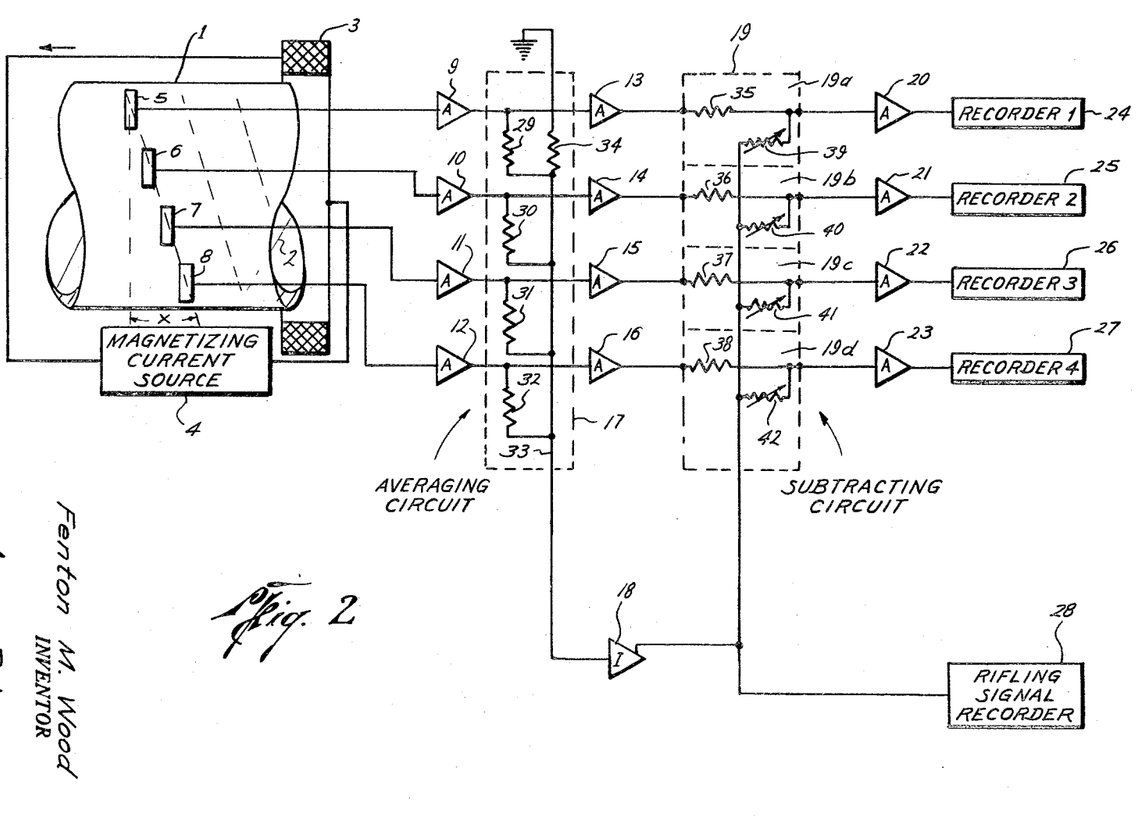
FIGURE 2 is a detailed schematic diagram of the preferred embodiment shown in FIGURE 1.

A detailed schematic of the preferred embodiment is shown in FIGURE 2. As described above, pipe 1 with interior rifling 2 is shown with magnetizing coil 3 surrounding its exterior wall surface. Coil 3 is coupled to current source 4 to provide a longitudinal magnetic flux field with which to magnetize pipe 1.

Transducers 5–8 are identical search-coils, magnetometers or other magnetic anomaly detectors mounted for transverse movement along the surface of pipe 1. The transducers are spaced circumferentially around the exterior or interior surface of pipe 1 along a helical line having helix angle X corresponding to the helix angle of pipe rifling 2. Each of the detectors of transducers 5–8 is connected in the same sense as the other detectors in order that the induced signals will all be of the same polarity.

Four transducers are utilized in the preferred embodiment shown in FIGURE 2. However, there can be any number of transducers depending on the size of the detectors and the circumference of the pipe to be inspected. The search-coils, magnetometers or other magnetic anomaly detectors can be of various sizes, the limiting dimension being the smallest width of a fatigue crack or pit on which a full signal is desired. In general operation, however, coils of ¾″ to 2″ are more commonly employed.

It is necessary that the detectors of transducers 5–8 be distributed in a helical pattern circumscribing the interior or exterior surface of pipe 1 in order that each of the signals produced as a result of natural pipe rifling 2 will be in the same time phase relationship. The helix angle X is predetermined by measurement of the rifling helix angle within a section of pipe to be inspected as discussed previously. Of course, helix angle X varies depending on the type of pipe and its manufacturer. Drill pipe commonly has a helix angle of 6 to 12 degrees, while in pipeline helix angles vary greatly from approximately 4 to 20 degrees.

As the detectors of transducers 5–8 are moved relative to the surface of pipe 1, variations in the magnetic flux emanating from the pipe surface is detected. A discrete varying current is induced in each detector proportional to the varying magnetic flux variation. Each of the detectors of transducers 5–8 should encounter the magnetic flux variation due to pipe rifling 2 at approximately the same time, in order that the signals induced in the detectors will all be in approximately the same time phase relationship and of approximately the same magnitude.

The detectors of transducers 5–8 are coupled to identical amplifiers 9–12, respectively. The discrete output signals of amplifiers 9–12 are applied respectively to the inputs of amplifiers 13–16 and to resistors 29–32 of the averaging circuit 17. Each of resistors 29–32 is coupled to an average signal bus 33, which in turn is coupled to the input of inverter 18. The other end of average signal bus 33 is connected through resistor 34 to ground potential.

Averaging circuit 17 produces an average of the detected discrete signals on average bus 33. The average signal principally represents pipe rifling with pitting signals being averaged out and not present to a significant degree. The average signal is applied to inverter 18, amplified, inverted and applied to subtracting circuit 19.

The amplified output signals of amplifiers 13–16 are applied respectively to one side of resistors 35–38 in the subtracting circuits 19a–19d. The inverted average signal is applied through variable resistors 39–42 to the other side of resistors 35–38, respectively, in the subtracting circuits 19a–19d to cancel the rifling signal in each channel of detected signals. Resistors 39–42 are variable in order that the inverted average signal may be adjusted to the correct level necessary to cancel the rifling signal from each detected signal.

The inverted average signal, applied through variable resistors 39–42, is algebraically added to each of the amplified total detected signals applied through resistors 35–38 of subtracting circuits 19a–19d. This algebraic summation subtracts the average signal from each in-phase detected signal to leave a resultant difference signal representing substantially a true pitting signal with rifling signals virtually eliminated.

The pitting signals will appear on the average signal bus 33 at a level $1/N$ when N transducers are interconnected and arranged in the manner previously described. Thus, each pitting signal will be reduced only slightly by this technique. The smaller the size of the detectors, coupled with the greater number needed to span the circumference of pipe 1, the lower will be the level of the pitting signals appearing on average signal bus 33. Using this technique, cancellation of random oriented pitting signals is virtually impossible.

The difference signals produced by subtracting circuit 19 representing substantially true pitting signals, are applied to amplifiers 20–23, respectively. The amplified pitting signal outputs of amplifiers 20–23 are applied to recorders 24–27, respectively, to record the pitting signals for analysis. A recorder 28 may be provided to record the inverted average signal for further analysis if desired. With transducers 5–8 oriented to conform to the physical outline of the regular cyclic change of uniformity of cross section of pipe 1, the same technique as discussed above can be used to eliminate the unwanted noise caused by such cyclic changes.

Figure 3:
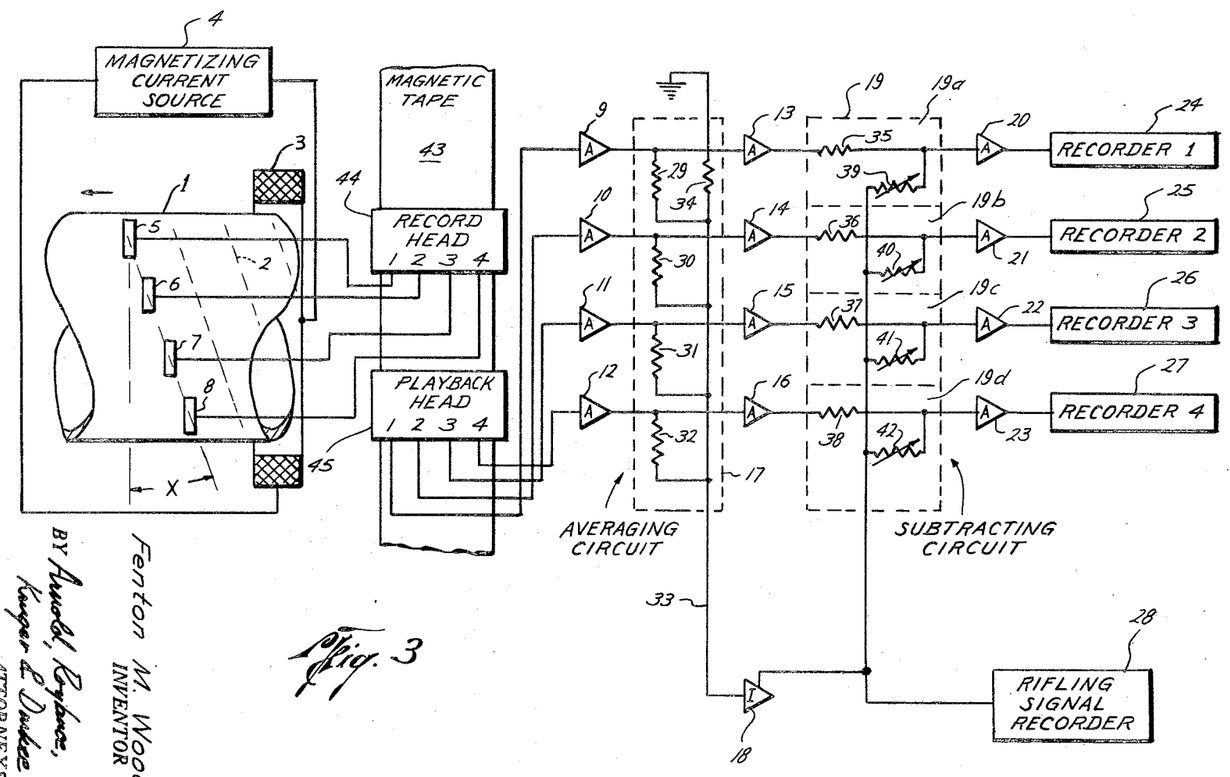
FIGURE 3 is a detailed schematic of another embodiment of the present invention.

FIGURE 3 illustrates another embodiment of the present invention. Pipe 1 with rifling 2 is similarly saturated with a magnetic flux field as described previously in the prior embodiment. The arrangement of the transducers, the connection of the detectors of each transducer 5–8, and their operation is identical to that described in the prior embodiment and will not be described further.

In this embodiment of the present invention, the analog signals induced in transducers 5–8 are applied to channels 1–4 of magnetic tape 43 through record head 44. Thus, use of the magnetic tape to record the detected signals provides a record of the total detected signals from each transducer, prior to correction and elimination of the rifling signal, and can be a useful tool for further analysis and greater refinement in the elimination of the rifling signal.

It is customary to add the analog signals from transducers 5–8 to the output level of a bias oscillator (not shown) before application to record head 44. Since this is conventional circuitry, no detail of the bias oscillator or recording head amplifiers is offered here.

The analog signals recorded on magnetic tape 43 are picked up by play-back head 45 and applied to the inputs of amplifiers 9–12. The operation of circuit from the outputs of amplifiers 9–12 to the recording of the difference signals by recorders 24–27 is identical to the operation discussed above in the preferred embodiment.

Figure 4:
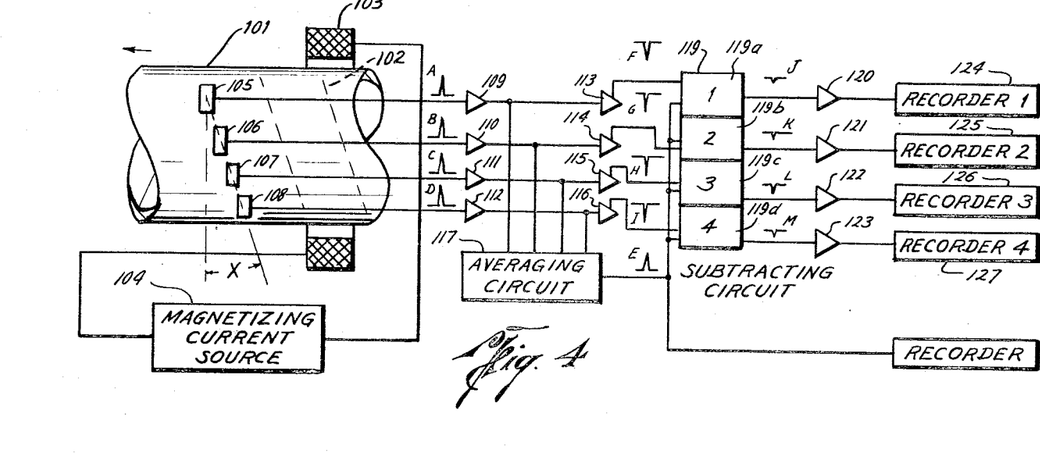
FIGURE 4 is a simplified schematic of still another embodiment of the present invention.

A third embodiment of the present invention is illustrated in FIGURE 4. In this embodiment pipe 101 with rifling 102 is magnetized by passing a current through magnetizing coil 103 from current source 104 to provide a longitudinal flux field. As in the other examples, a circumferential magnetic flux field may be employed, however, it is not preferred.

Transducers 105–108 are circumferentially arranged around the outside or inside diameter of pipe 101 following a helical angle corresponding to the helix angle X of rifling 102 as previously discussed in the other embodiments. The arrangement, size, and function of the detectors is identical to that described in the previous embodiments, and will not be described further.

The detected signal outputs of transducers 105–108, better shown as A through D of FIGURE 4, are applied respectively to amplifiers 109–112. The amplified signal outputs of amplifiers 109–112 are applied respectively to the inputs of amplifier-inverters 113–116 and to an averaging circuit 117. The inverted detected signal outputs from amplifier-inverters 113–116, shown as F through I in FIGURE 4, are applied to subtracting circuit 119. The average rifling signal from averaging circuit 117, shown as E in FIGURE 4, is applied to each respective inverted detector signal in subtracting circuits 119a–119d. The average rifling signal E is subtracted from each of the inverted detector signals, shown as F through I of FIGURE 4, to produce difference signals at the outputs of subtracting circuits 119a–119d, better shown as J through M in FIGURE 4, which are in turn applied respectively to the inputs of amplifiers 120–123. The difference signals, shown as J through M of FIGURE 4, are substantially true detected pitting signals. The outputs of amplifiers 120–123 are applied respectively to recorders 124–127 to record the pitting signals for analysis. If desired, a recorder 128 can be provided to record the average signal E for further analysis.

This embodiment eliminates the need for an inverter-amplifier to invert the average rifling signal prior to its subtraction from each of the detected signals. If the inverter were omitted, however, it is desirable that an isolation stage be inserted between the averaging circuit and the subtracting circuit.

Figure 5:
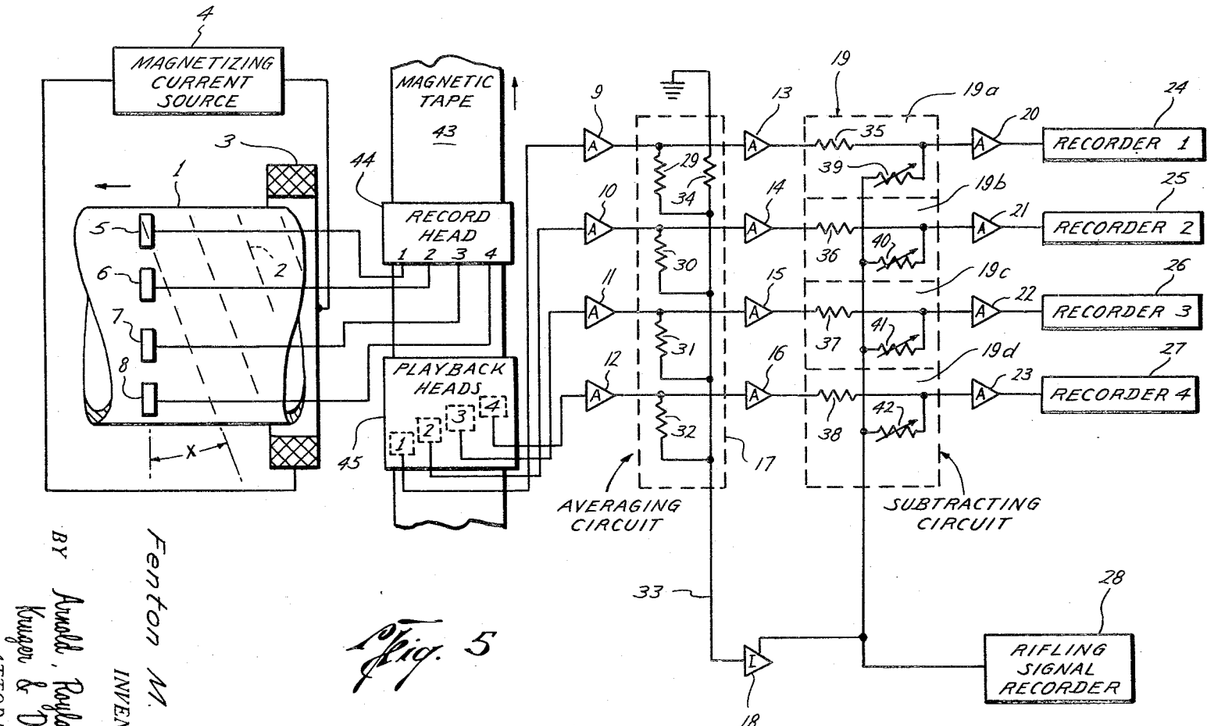
FIGURE 5 is a simplified schematic of still another embodiment of the present invention.

Another embodiment of the invention is shown in FIGURE 5. This embodiment is an alternative to the embodiment shown in FIGURE 3. Pipe 1 with rifling 2 is magnetized by magnetizing coil 3 and a current source 4 as previously discussed. However, transducers 5–8 are circumferentially arranged around the inside or outside diameter of pipe 1 in a line normal to the axis of the pipe, and do not follow a helical angle corresponding to the helical angle X of rifling 2 as discussed in previous embodiments. The size, function and connections of the detectors is identical to that described in previous embodiments.

The detected signal outputs of transducers 5–8 are applied to channels 1–4 of magnetic tape 43 through record head 44. In conventional magnetic tape recording, it is customary to add the signals from transducers 5–8 to the output level of a bias oscillator (not shown) before aplication to record head 44. Since this is conventional circuitry no further detail of the bias oscillator will be offered here.

The playback heads for channels 1–4, housed in unit 45, are skewed across the magnetic tape to achieve the same effect as arranging the transducers 5–8 in a pattern corresponding to the helix angle of rifling 2. As can be seen in FIGURE 5, transducer 5 will cut across the magnetic flux variation caused by rifling 2 prior to transducers 6–8, and will therefore detect and produce a signal to be recorded before transducers 6–8. Similarly, transducer 6 will enter the magnetic flux variation caused by rifling 2 prior to transducers 7 and 8, causing a signal to be produced and recorded before transducers 7 and 8 detect the magnetic flux variation caused by rifling 2. It will be seen that the signals recorded on channels 1–4 will not be in the same time phase relation, with the signal of channel 1 leading the signal of channel 2, the signal of channel 2 leading the signal of channel 3, and the signal of channel 3 leading the signal of channel 4. With the playback heads of channels 1–4 in unit 45 arranged as shown in FIGURE 5, the playback head for channel 1 physically lags the playback head for channel 2, the playback head for channel 2 lags the playback head for channel 3, and the head for channel 3 lags the head for channel 4. This physical positioning can be adjusted to produce output signals to amplifiers 9–12 that are in the same time phase relationship. The operation of the remainder of the circuit from amplifiers 9–12 through averaging circuit 17, amplifier 13–16, subtracting circuit 19, amplifiers 20–23 and recorders 24–27 is identical to that discussed for the embodiment shown in FIGURE 3. Of course, it can be seen that by skewing the record heads in a similar manner while leaving the playback heads in a fixed position for simultaneous playback, the same effect of simultaneous in-phase signals to amplifiers 9–12 can be achieved.

The embodiment just described can be useful in recording pitting and flaw signals utilizing present detecting schemes and providing the flexibility of magnetic tape recording for further analysis and greater refinement in producing in-phase signals from recorded channels.

What is claimed is:

1. In electromagnetic inspection apparatus adapted for detecting and indicating defects in a ferromagnetic pipe having established therein a field of magnetic flux and having a natural magnetic pattern of known form, the detection device comprising:
   detecting means adapted for movement relative to said pipe to produce a plurality of discrete signals of the same polarity in response to the variations in said magnetic flux field,
      said plurality of discrete signals being simultaneously induced and each being in the same time phase relationship when caused by the natural magnetic pattern of known form of said pipe; and
   signal difference determination means to average said plurality of discrete signals and to subtract said average signal from each of said plurality of discrete signals to produce a plurality of discrete difference signals suitable for indication as a measure of actual defects in said pipe.

2. The apparatus in accordance with claim 1, wherein said detecting means comprises a plurality of magnetic transducers circumferentially disposed around the peripheral surface of said pipe and along a line having the same configuration as the natural magnetic pattern of known form of said pipe.

3. The apparatus in accordance with claim 2, wherein said signal difference determination means comprises:
   averaging means to average said plurality of discrete detected signals,
      said average signal being substantially an average of the noise signal caused by said natural magnetic pattern of known form of said pipe under inspection;
   inverting means to invert said average signal; and
   subtracting means to subtract said inverted average signal from each of said plurality of discrete detected signals to produce said plurality of discrete difference signals.

4. The apparatus in accordance with claim 2, wherein said signal difference determination means comprises:
   inverting means to invert each of said plurality of discrete detected signals;
   averaging means to average said plurality of discrete detected signals;
      said average signal being substantially an average of the noise signal caused by said natural magnetic pattern of known form of said pipe under inspection; and
   subtracting means to subtract said average signal from each of said plurality of inverted discrete detected signals to produce said plurality of discrete difference signals.

5. In electromagnetic inspection apparatus adapted for detecting and indicating defects in a ferromagnetic pipe having established therein a field of magnetic flux and having a natural magnetic pattern of known form, the detection device comprising:
   detecting means adapted for movement relative to said pipe to induce a plurality of discrete signals of the same polarity reflecting the variations in said magnetic flux field,
      said plurality of discrete signals being simultaneously induced and each being in the same time phase relationship when caused by the natural magnetic pattern of known form of said pipe;
   means for recording said plurality of discrete signals upon a magnetic tape;
   means for retrieving said plurality of discrete signals from said magnetic tape; and
   signal difference determination means to average said plurality of retrieved discrete signals and to subtract said average signal from each of said plurality of discrete signals to produce a plurality of discrete difference signals suitable for indication as a measure of actual defects in said pipe.

6. The apparatus in accordance with claim 5, wherein said detecting means comprises a plurality of magnetic transducers circumferentially disposed around the peripheral surface of said pipe and along a line having the same configuration as the natural magnetic pattern of known form of said pipe.

7. The apparatus in accordance with claim 6, wherein said signal difference determination means comprises:
   averaging means to average said plurality of discrete detected signals,
      said average signal being substantially an average of the noise signal caused by said natural magnetic pattern of known form of said pipe under inspection;
   inverting means to invert said average signal; and
   subtracting means to subtract said inverted average signal from each of said plurality of discrete detected signals to produce said plurality of discrete difference signals.

8. The apparatus in accordance with claim 6, wherein said signal difference determination means comprises:

averaging means to average said plurality of discrete detected signals;
said average signal being substantially an average of the noise signal caused by said natural magnetic pattern of known form of said pipe under inspection;
inverting means to invert each of said plurality of discrete detected signals; and
subtracting means to subtract said average signal from each of said plurality of inverted discrete detected signals to produce said plurality of discrete difference signals.

9. In electromagnetic inspection apparatus adapted for detecting and indicating defects in a ferromagnetic pipe having established therein a field of magnetic flux and having a natural magnetic pattern of known helical form, the detection device comprising:
detecting means adapted for movement relative to said pipe to produce a plurality of discrete signals of the same polarity in response to the variations in said magnetic flux field,
said plurality of discrete signals being simultaneously induced and each being in the same time phase relationship when caused by the natural magnetic pattern of known helical form of said pipe; and
signal difference determination means to average said plurality of discrete signals and to subtract said average signal from each of said plurality of discrete signals to produce a plurality of discrete difference signals suitable for indication as a measure of actual defects in said pipe.

10. The apparatus in accordance with claim 9, wherein said detecting means comprises a plurality of magnetic transducers circumferentially disposed around the peripheral surface of said pipe and along a line having approximately the same configuration as the natural magnetic pattern of known helical form of said pipe.

11. The apparatus in accordance with claim 10, wherein said signal difference determination means comprises:
averaging means to average said plurality of discrete detected signals,
said average signal being substantially an average of the noise signal caused by said natural magnetic pattern of known helical form of said pipe under inspection;
inverting means to invert said average signal; and
subtracting means to subtract said inverted average signal from each of said plurality of discrete detected signals to produce said plurality of discrete difference signals.

12. The apparatus in accordance with claim 10, wherein said signal difference determination means comprises:
inverting means to invert each of said plurality of discrete detected signals;
averaging means to average said plurality of discrete detected signals;
said average signal being substantially an average of the noise signal caused by said natural magnetic pattern of known helical form of said pipe under inspection; and
subtracting means to subtract said average signal from each of said plurality of inverted discrete detected signals to produce said plurality of discrete difference signals.

13. The apparatus in accordance with claim 11, wherein said averaging means comprises:
a first amplifying means to amplify each of said plurality of discrete detected signals to a preselected level;
an averaging circuit to average said plurality of discrete first amplified signals,
said average signal being a representative average of the noise signal caused by said natural helical magnetic pattern of said pipe under inspection; and
a second amplifying means to amplify each of said first discrete amplified signals to a preselected level suitable for application to said subtracting means.

14. The apparatus in accordance with claim 13, wherein said subtracting means comprises:
a subtracting circuit to subtract said inverted average signal from each of said second discrete amplified signals for cancelling the component that represents the signal caused by said natural helical magnetic pattern from each of said second discrete amplified signals,
said subtracting circuit producing a plurality of discrete difference signals each of which represents the difference between the output of said second discrete amplified signals and said average signal; and
a third amplifying means to amplify each of said plurality of discrete difference signals to a preselected level suitable for indication.

15. The apparatus in accordance with claim 12, wherein said averaging means comprises:
a first amplifying means to amplify each of said plurality of discrete detected signals to a preselected level suitable for application to said inverting means; and
an averaging circuit to average said plurality of discrete first amplified signals,
said average signal being a representative average of the noise signal caused by said natural helical magnetic pattern of said pipe under inspection.

16. The apparatus in accordance with claim 12, wherein said subtracting means comprises:
a subtracting circuit to subtract said average signal from each of said plurality of discrete inverted signals, for cancelling the component that represents the signal caused by said natural helical magnetic pattern from each of said discrete inverted signals,
said subtracting circuit producing a plurality of discrete difference signals, each of which represents the difference between said discrete inverted signals and said average signal; and
a final amplifying means to amplify each of said plurality of discrete difference signals to a preselected level suitable for indication.

17. In electromagnetic inspection apparatus adapted for detecting and indicating defects in a ferromagnetic pipe having established therein a field of magnetic flux and having a natural magnetic pattern of known helical form, the detection device comprising:
detecting means adapted for movement relative to said pipe to produce a plurality of discrete signals of the same polarity in response to the variations in said magnetic flux field,
said plurality of discrete signals being simultaneously induced and each being in the same time phase relationship when caused by the naturel magnetic pattern of known helical form of said pipe;
means for recording said plurality of discrete signals upon a magnetic tape;
means for retrieving siad plurality of discrete signals from said magnetic tape;
signal difference determination means to average said plurality of retrieved discrete signals and to subtract said average signal from each of said plurality of discrete difference signals suitable for indication as a measure of actual defects in said pipe.

18. The apparatus in accordance with claim 17, wherein said detecting means comprises a plurality of magnetic transducers circumferentially disposed around the peripheral surface of said pipe and along a line having approximately the same configuration as the natural magnetic pattern of known helical form of said pipe.

19. The apparatus in accordance with claim 18, wherein said signal difference determination means comprises:
averaging means to average said plurality of discrete amplified signals,
said average signal being substantially an average of the noise signal caused by said natural magnetic pattern of known helical form of said pipe under inspection;
inverting means to invert said average signal; and
subtracting means to subtract said inverted average signal from each of said plurality of discrete detected signals to produce said plurality of discrete difference signals.

20. The apparatus in accordance with claim 18, wherein said signal difference determination means comprises:
inverting means to invert each of said plurality of discrete detected signals;
averaging means to average said plurality of discrete detected signals;
said average signal being substantially an average of the noise signal caused by said natural magnetic pattern of known helical form of said pipe under inspection; and
subtracting means to subtract said average signal from each of said plurality of inverted discrete detected signals to produce said plurality of discrete difference signals.

21. The apparatus in accordance with claim 19, wherein said averaging means comprises:
a first amplifying means to amplify each of said plurality of discrete detected signals to a preselected level;
an averaging circuit to average said plurality of discrete first amplified signals,
said average signal being a representative average of the noise signal caused by said natural helical magnetic pattern of said pipe under inspection; and
a second amplifying means to amplify each of said first discrete amplified signals to a preselected level suitable for application to said subtracting means.

22. The apparatus in accordance with claim 21, wherein said subtracting means comprises:
a subtracting circuit to subtract said inverted average signal from each of said second discrete amplified signals, for cancelling the component that represents the signal caused by said natural helical magnetic pattern from each of said second discrete amplified signals,
said subtracting circuit producing a plurality of discrete difference signals each of which represents the difference between the output of said second discrete amplified signals and said average signal; and
a third amplifying means to amplify each of said plurality of discrete difference signals to a preselected level suitable for indication.

23. The apparatus in accordance with claim 20, wherein said averaging means comprises:
a first amplifying means to amplify each of said plurality of discrete detected signals to a preselected level suitable for application to said inverting means; and
an averaging circuit to average said plurality of discrete first amplified signals,
said average signal being a representative average of the noise signal caused by said natural helical magnetic pattern of said pipe under inspection.

24. The apparatus in accordance with claim 20, wherein said subtracting means comprises:
a subtracting circuit to subtract said average signal from each of said plurality of discrete inverted signals, for cancelling the component that represents the signal caused by said natural helical magnetic pattern from each of said discrete inverted signals,
said subtracting circuit producing a plurality of discrete difference signals, each of which represents the difference between said discrete inverted signals and said average signal; and
a final amplifying means to amplify each of said plurality of discrete difference signals to a preselected level suitable for indication.

25. In electromagnetic inspection apparatus adapted for detecting and indicating defects in a ferromagnetic pipe having established therein a field of magnetic flux and having a natural magnetic pattern of known helical form, the detection device comprising:
a plurality of magnetic transducers circumferentially disposed around the peripheral surface of said pipe, said transducers adapted for movement relative to said pipe to produce a plurality of signals of the same polarity in response to the variations in said magnetic flux field caused by the natural magnetic pattern of known helical form of said pipe;
magnetic tape storage and retrieval means to convert said signals into a plurality of simultaneous discrete signals each being in the same time phase relationship; and
signal difference determination means to average said plurality of retrieved discrete signals and to subtract said average signal from each of said plurality of discrete signals to produce a plurality of discrete difference signals suitable for indication as a measure of defects in said pipe.

26. The apparatus in accordance with claim 25, wherein said signal difference determination means comprises:
inverting means to invert each of said plurality of discrete retrieved signals;
averaging means to average said plurality of discrete retrieved signals;
said average signal being substantially an average of the noise signal caused by said natural magnetic pattern of known helical form of said pipe under inspection; and
subtracting means to subtract said average signal from each of said plurality of inverted discrete retrieved signals to produce said plurality of discrete difference signals.

27. The apparatus in accordance with claim 26, wherein said averaging means comprises:
a first amplifying means to amplify each of said plurality of discrete retrieved signals to a preselected level suitable for application to said inverting means; and
an averaging circuit to average said plurality of discrete first amplified signals,
said average signal being a representative average of the noise signal caused by said natural helical magnetic pattern of said pipe under inspection.

28. The apparatus in accordance with claim 26, wherein said subtracting means comprises:
a subtracting circuit to subtract said average signal from each of said plurality of discrete inverted signals, for cancelling the component that represents the signal caused by said natural helical magnetic pattern from each of said discrete inverted signals,
said subtracting circuit producing a plurality of discrete difference signals each of which represents the difference between said discrete inverted signals and said average signal; and
a final amplifying means to amplify each of said plurality of discrete difference signals to a preselected level suitable for indication.

29. In electromagnetic inspection apparatus adapted for detecting and indicating defects in a ferromagnetic pipe having established therein a field of magnetic flux and having a natural magnetic pattern of known helical form, the detection device comprising:
a plurality of magnetic transducers circumferentially disposed around the peripheral surface of said pipe, said transducers adapted for movement relative to said pipe to induce a plurality of signals of the same polarity reflecting the variations in said magnetic flux field caused by the natural magnetic pattern of known form of said pipe;

means for recording said plurality of signals induced by said transducers upon a magnetic tape;

means for retrieving said plurality of signals from said magnetic tape; said retrieving means adapted to convert said signals into a plurality of simultaneous discrete signals of the same time phase relationship;

a plurality of first amplifier stages to amplify said plurality of discrete retrieved signals to a preselected level, each of said first amplifier stages receiving one of said plurality of discrete retrieved signals;

a plurality of second amplifier stages to raise said plurality of first amplified signals to a desired level, the input of each of said second amplifier stages being coupled to the output of one of said first amplifier stages;

an averaging circuit coupled to the outputs of said plurality of first amplifier stages to average said plurality of first amplified signals, said average signal being a representative average of the strength of the noise signal caused by said natural helical magnetic pattern of said pipe under inspection;

an inverter stage to invert said average signal produced by said averaging circuit;

a subtracting circuit to subtract said inverted average signal from each of said plurality of second discrete amplified signals to cancel the component that represents the signal caused by said natural helical magnetic pattern from each of said second discrete amplified signals, said subtracting circuit producing a plurality of discrete difference signals each of which represents the measure of defects in said pipe; and a plurality of third amplifier stages each of which receives one of said discrete difference signals for amplification to a level suitable for indication.

References Cited

UNITED STATES PATENTS

| | | | |
|---|---|---|---|
| 2,436,503 | 2/1948 | Cleveland. | |
| 2,740,090 | 3/1956 | Dionne | 324—37 |
| 2,746,012 | 5/1956 | Price | 324—37 |
| 3,284,701 | 11/1966 | Kerbow | 324—37 |

ALFRED E. SMITH, Primary Examiner

U.S. Cl. X.R.

324—40; 346—33